March 25, 1952 M. FLADMARK 2,590,303
PROCESS FOR THE MANUFACTURE OF OIL AND FOOD PRODUCTS
FROM HERRINGS, WHALES, AND OTHER SEA ANIMALS
Filed June 1, 1951 2 SHEETS—SHEET 1

Morten Fladmark
Inventor.

By Shenderoth, Lind & Ponack
Attorneys.

Morten Fladmark
Inventor.

Patented Mar. 25, 1952

2,590,303

UNITED STATES PATENT OFFICE 2,590,303

PROCESS FOR THE MANUFACTURE OF OIL
AND FOOD PRODUCTS FROM HERRING,
WHALES, AND OTHER SEA ANIMALS

Morten Fladmark, Oslo, Norway

Application June 1, 1951, Serial No. 229,382
In Norway October 9, 1943

4 Claims. (Cl. 99—2)

This application is a continuation in part of my prior co-pending application Serial No. 650,104, dated February 25, 1946, now Patent No. 2,565,173, issued August 21, 1951.

The present invention relates to the treatment of herrings and other fishes as well as whales and other sea mammals or parts thereof to recover cattle food, oils or other useful products therefrom.

In the conventional processes for the treatment of raw-materials of the named character the material is first heated or cooked to facilitate subsequent separation of liquid, comprising oils or fat from undissolved solids. The heated raw material is thereupon subjected to a mechanical treatment to separate solids from liquid (the so called "glue water"), whereupon the solid residuum is dried by heat to obtain a keeping dry product, usually in a disintegrated condition ("fish meal," "whale meal" and the like).

In the case of fat fishes (such as herrings) and sea mammals the oil or fat contained in the "glue water" is usually separated from the aqueous liquid by decantation or centrifugal treatment. The remaining liquid (glue water) in most cases is not further utilized, but is handled as a waste material.

In the course of the later years, however, several attempts have been made to recover the protein solids contained in this glue water, mostly by means of evaporation to dryness or to a semifluid liquid. Complete evaporation to dryness, however, as well known, involves great difficulties of a technical as well as an economic character owing to the low percentage of solids in the glue water and to the sticky character of the concentrated product.

In a known process the glue water is first evaporated in open vessels or under a vacuum to a concentration of between 40 and 45 percent of solids, whereupon the semifluid liquid is spread on the surface of heated drums and dried thereon to obtain a solid product.

In the process which is the object of the present invention the glue water as it is obtained in the course of the conventional sequence of operations in herring oil factories, having a temperature below 100° C., is heated under pressure to a temperature considerably above 100 C. (usually between 120° C. and 170° C.) and subject to evaporation under such increased temperature and pressure until its percentage of solids has been raised to considerably above 45 per cent (preferably between 50 and 70 per cent).

In whale oil factories and other like industries, where the raw material is heated under a high pressure and at a correspondingly high temperature the resulting glue water frequently has a sufficiently high temperature to need no further supply of heat before it enters the pressure evaporator. It may then be introduced directly from the pressure digesters into the pressure evaporators.

It has been found that by this evaporation under pressure the product is retained in a sufficiently thinly fluid condition until its percentage of solids has been increased far above that which has been hitherto considered to be attainable by conventional methods of evaporation.

In a series of experiments made, glue water concentrates have been obtained, which are fluid at atmospheric temperature and which contain between 45 and 70 per cent of solids.

When the concentrated glue water obtained by this evaporation under pressure is discharged in a hot condition into barrels or other containers for storage or transportation, it has been found that the product is keepable for a very long time.

It has also been found that the product as obtained by this pressure evaporation retains its nutritional value, and even that its value as a vitamin source has not been reduced to any appreciable degree. This is contrary to what had been predicted by scientists particularly interested in the use of the product as a poultry food or similar purposes.

In order to avoid appreciable alterations of the protein constituents of the glue water by the high temperature evaporation according to the invention, it is preferred in carrying out the process on a commercial scale to operate in such a way as to shorten as far as possible the period of time during which the glue water is kept heated to the maximum temperature of the entire evaporation treatment.

This may be brought about in several ways, for example by carrying out the evaporation in a plurality of stages and under such conditions that the evaporation in one or more of the stages takes place at comparatively low temperatures, even below 100° C. and under a vacuum.

An important advantage of the process according to the invention also consists therein that the water vapour obtained by the pressure evaporation has the character of pressure steam suitable for use as a heating medium in the cooking or heating apparatus in which the raw material (herrings, whale meat or the like) is heated prior to the conventional separation treatment in presses, steamers, settling tanks or other suitable apparatus to separate "glue water" from solids.

The pressure steam from the glue water evaporator will be of such a character as to be capable of substituting steam from ordinary steam boilers otherwise required in factories of the character in question. The steam from the pressure evaporator is suitable for heating the raw material (herrings, whale meat and the like) by direct heating (in direct contact with the material) as well as by indirect heating (where there is no direct contact of the steam with the raw material).

When the steam from the pressure evaporator is of a tolerably pure character it can be introduced directly into the raw material to be heated. Such parts of the obtained steam, however, which contain substantial amounts of impurities, such as ammonia, amines, mercaptones etc. is preferably used for indirect heating purposes as a heating medium in the digester provided with heating jackets or pipes etc.

When the process of the present invention is made use of in such processes, wherein the raw material is heated in open vessels (to temperatures below 100° C.), steam from the evaporators is suitable as a heating agent, even when the evaporator is operated at a comparatively low pressure. But when the heating or cooking of the raw material—such as whale meat or blubber, takes place under a high pressure, the evaporators or at least one of them must be operated under a correspondingly high pressure, above that to prevail in the cooker or digester employed. The duration of the high temperature evaporation of the glue water may be shortened by carrying out a part of the evaporation at low temperatures and pressures. This part of the evaporation may be carried out at a reduced pressure (vacuum evaporation). The high temperature evaporation may be the first or last or an intermediate evaporation stage in a multiple evaporation plant. When a series of evaporators is used, and the highest pressure is to be maintained in the last or later stages in the series, the liquid may be pumped into the high pressure evaporator from the lower pressure evaporator or evaporators. The arrangement and method of operation may, however, also be such that in a number of evaporators (in batch operation) the pressure is raised alternately and successively in the one after the other of the evaporators by means of increased supply of heat.

In a preferred embodiment of the invention the glue water is introduced into an evaporation apparatus operating under high pressure and heated by means of pressure steam, for example from an ordinary steam boiler. The exhaust steam from the pressure evaporation of glue water is then passed at a suitable temperature and pressure to the heating apparatus or cooker (digestor) for the raw material (herrings, whale meat or the like). The water of condensation from the pressure evaporator may be returned to the steam boiler.

The pressure evaporation of the glue water may be carried into effect in a single or in a plurality of steps in accordance with the amount of steam needed for the heating or cooking of the raw material and with the quantity of glue water to be evaporated.

By the method of operation according to the invention important advantages are attained. These advantages are in part due to the fact that the generation of cooking steam and the evaporation of the glue water takes place in one and the same operation. It is practically correct to say that by this way of generating the cooking steam, the evaporation of the glue water will be attained without cost or at least without a substantial increase in the fuel expense.

Another important advantage consists therein that no supply of fresh water is needed for the steam cooking or heating of the raw materials. The water required for generation of steam for the cooking operation can be supplied through the raw materials, from which it is obtained in the form of glue water. This water and the steam generated therefrom will thus in part pass into the cycle of operations, after the liquid has been purified and the oil separated off, then through the pressure evaporator and therefrom in the form of steam back to the cooker.

Water leaves the system in part as steam to the cooker and in part through the concentrated glue water, which may contain for example between 50 and 30 per cent of water.

As it will be apparent from the above, no special supply of fresh water is needed for the steam generator, preferably an ordinary steam boiler, because the water of condensation from the pressure evaporator can be returned to the steam boiler.

The fresh water problem for the herring oil and meal factories, as well as for the whale stations, is always of imperative importance.

The glue water evaporation plant may be of ordinary construction and may for example consist of an apparatus with tubes surrounded by the heating medium (pressure steam). The glue water may be supplied to the evaporation apparatus at top or at bottom of same.

The process according to the invention is illustrated by way of examples in the accompanying drawing in which Fig. 1 is a diagrammatic view of a single stage evaporation plant. Fig. 2 is a diagrammatic view of a multiple stage evaporator.

Figure 1:
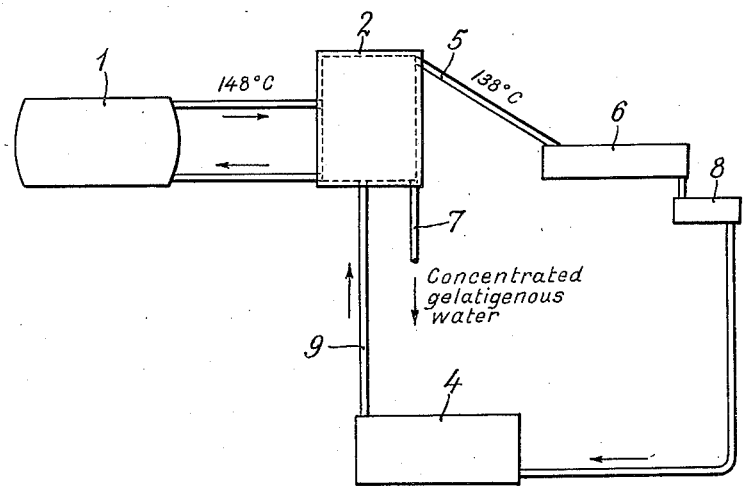

In Example 1 the reference numeral 1 designates an ordinary steam boiler for the generation of high pressure steam, which passes to the pressure evaporator 2 for glue water. The temperature of the steam entering the pressure evaporator may be for example about 148° C. At the bottom of the pressure evaporator water of condensation is collected, and this water is returned to the steam boiler 1 through pipe 3. In the pressure evaporator the glue water is concentrated, and the vapour (steam) is passed therefrom through pipe 5 with a temperature of for example 133° C. to an open cooker 6, where the raw material is cooked (digested) or heated, respectively. The glue water is separated from solids in the press 8 and then passed to a container 4, and therefrom through pipe 9 to the pressure evaporator 2, after having been subjected to conventional purification treatments. The concentrated glue water leaves the pressure evaporator 2 through pipe 7. The glue water may at this stage have been concentrated to a percentage of solids of for example about 55%.

Figure 2:
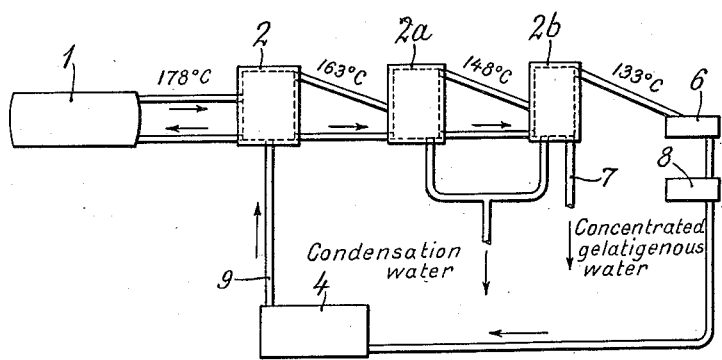

In the example illustrated in Fig. 2, the plant comprises three pressure evaporators where the vapour (steam) evolved from the glue water in the evaporator 2 is passed to the heat tubes in evaporator 2a, where it is condensed. The glue water preconcentrated in evaporator 2 is passed to the evaporator 2a, where it is further concentrated. The exhaust vapours (steam) from the glue water evaporation in evaporator 2a are passed to the heat tubes in evaporator 2b, where they are condensed. The glue water further concentrated in evaporator 2a is passed to the evaporator 2b, where it is further concentrated. The exhaust vapours (steam) from the glue water evaporation in evaporator 2b is passed to the cooker (or heater) 6 for cooking (or heating respectively) of the initial material. The finally concentrated glue water (of for instance 65% solids) is drawn off from the evaporator 2b.

Water of condensation from 2a and 2b, owing to its comparatively high temperature can with advantage be employed for example for preheating of glue water before it is passed to the evaporator 2. Water of condensation from the evaporator 2 may be returned to the steam generator, whereby a saving in fresh water to the steam boiler is attained.

Figure 3:
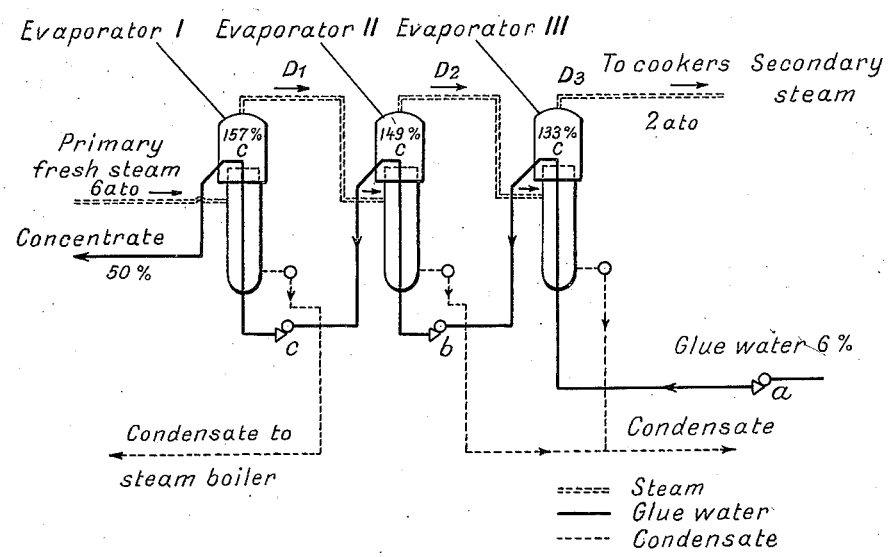
Fig. 3 illustrates a multiple stage evaporation plant in which the most concentrated liquid is subjected to the highest temperature.

In the example illustrated in Fig. 3 evaporation is carried out under pressure in three stages.

The dilute glue water containing about 6% of dissolved and suspended solids is passed by means of a pump a into the evaporator III where the lowest pressure and the lowest temperature is maintained (for example about 2 atmospheric pressure and about 133° C. temperature). The glue water evaporated in evaporator III is passed by means of a pump b into evaporator II for further concentration under a pressure of for example about 4 atmospheres and at a temperature of about 148° C. From this evaporator the further concentrated glue water is passed by means of pump c into evaporator I where the highest pressure of for example about 6 atmospheres and the highest temperature of about 157° C. is maintained.

When the glue water has reached the highest degree of concentration, containing for example about 50 per cent of solids it is discharged and filled into transportation containers or it is further treated for example to obtain the so-called "whole meal."

In this system, and as a consequence of the fact that primary steam is introduced into the heating members in evaporator I the final evaporation of the glue water takes place at the highest temperature and under the highest pressure. The vapours from evaporator III passes into the heating members in evaporator II. From this evaporator the evolved vapours pass to the heating members in evaporator III. The vapour from III in the form of secondary steam under a pressure of about 2 atmospheres (and temperature about 120° C.) may then be used to heat the raw materials (herrings, whale meat, blubber etc.).

Figure 4:
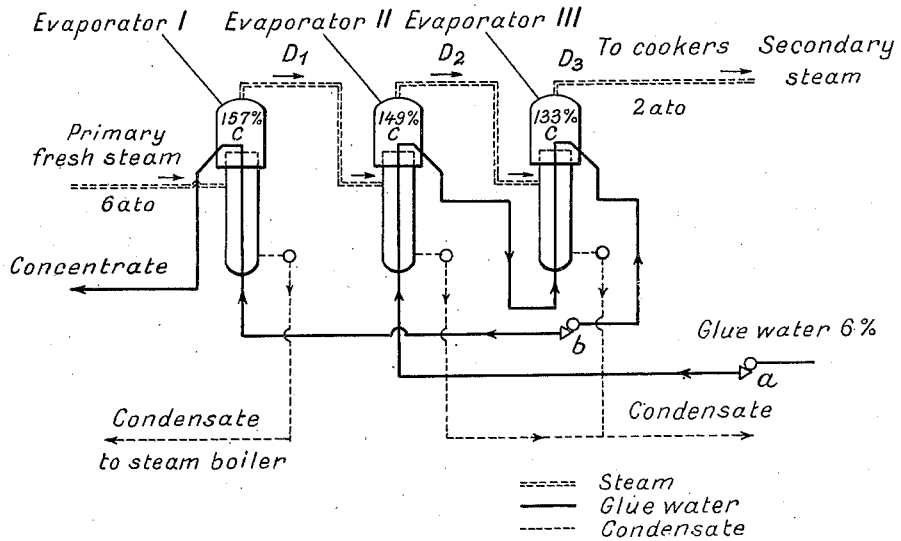
Fig. 4 illustrates a modified arrangement, in which the glue water to be evaporated is introduced at a stage in the plant where a temperature (and pressure) somewhat above the minimum temperature (and pressure) but below the maximum temperature (and pressure) of the system is maintained.

In the plant illustrated in Fig. 4 the dilute glue water (with for example about 6% solids) is forced by means of pump a into the evaporator II, from which it flows in a partially concentrated condition into evaporator III, where a lower pressure is maintained. Herefrom the further concentrated product is pumped into evaporator I, in which the highest temperature (and pressure) is maintained. The finally concentrated glue water is discharged from this evaporator (I).

The concentrated glue water produced according to the invention may be converted into a dry product by any suitable means, for example by the known method of atomizing the hot fluid in hot gas or by drum drying.

Besides carrying out the pressure evaporation in one or more stages, the pressure evaporation of the glue water, when desired, may also be combined with evaporation at atmospheric pressure or under reduced pressure (vacuum). Compression of the produced vapours may then in some instances be necessary. The preconcentrated glue water may, as it is desired, be taken out from the first, second or third (or later) pressure evaporator and introduced into a vacuum evaporator.

The concentrated glue water obtained by the methods above described, when it is to be converted into a solid state, may also—as in itself known—be directly mixed with moist press cakes before it is introduced into the conventional drier, such as a hot air drier.

The products produced according to the invention may be employed as cattle food, soup extracts, glue and the like.

It is a fact known to those skilled in this art that glue water from the conventional presses contains besides dissolved solids also a few per cent of suspended matter, and that these suspended solids involve great difficulties when the glue water is to be concentrated by evaporation, because these suspended solids become deposited on the interior surfaces of the evaporator. To avoid these difficulties it is usual to separate these particles from the liquid, for example by acidifying the liquid by adding some mineral acid, whereupon the liquid is filtered or subjected to centrifugal treatment.

According to the present invention these cumbersome operations are made unnecessary, it having been found that the said suspended matter becomes completely dissolved in the glue water in the course of the evaporation treatment under pressure and elevated temperatures.

This represents an important advantage of the present invention.

It is to be noted that in prior processes the viscosity of the glue water is rapidly increasing in the course of the evaporation, so that it is difficult to carry the concentration further than to about 40 per cent of solids. In the present process the concentration can be raised to above 50 per cent, for example to between 60 and 65 per cent and even to about 70 per cent and more without increasing the viscosity too much to make the handling difficult.

As an example may be mentioned that herring glue water has been evaporated to a concentration of about 70 per cent dry solids at a temperature of about 157° C. and a pressure of about 5.5 atmospheres, without the liquid losing its fluidity.

In a series of experiments it has also been found that the pH value of the glue water decreases in the course of the evaporation under pressure. As an example may be mentioned that the pH value has been found to become lowered from about 6.5 to about 5.

This change of pH value may in part account for the high keeping quality of the glue water concentrate obtained by the pressure evaporation according to the invention.

I claim:

1. A process for the treatment of herring, parts of whales and other marine animals to obtain cattle food, oils and other useful products therefrom, comprising the steps of heating the raw material with steam as a heating medium, subjecting the heated material to a treatment to separate as a liquid the so-called "glue water" from the undissolved solids, evaporating the glue water to a high degree of concentration at a temperature considerably above 100° C. under a pressure sufficiently high to result in the production of pressure steam, of which a part at least is thereupon utilized to heat the raw materials without entering into direct contact with the same.

2. A process for the treatment of marine animals to obtain cattle food, oils and other useful products therefrom, comprising the steps of heating the raw material by the use of steam as a heating medium, subjecting the heated material to a treatment to separate as a liquid, the so-called "glue water" from the undissolved solids, evaporating said glue water in a plurality of stages to a high degree of concentration, at least one of said evaporation stages being carried out at a temperature considerably above 100° C. under a pressure sufficiently high to result in the production of pressure steam to be used as a heating medium, and at least one of the said evaporation stages being carried out at a pressure below normal atmospheric pressure, steam from the said pressure evaporation of glue water being utilized to heat the raw material prior to the step of separating glue water from solids.

3. A process for the treatment of marine animal parts to obtain cattle food, oils and other useful products therefrom, comprising the steps of heating the raw material by the use of steam as a heating medium, subjecting the heated material to a treatment adapted to separate liquid, the so-called "glue water" from undissolved solids, evaporating the glue water to a degree of concentration of between 45 and 70 per cent of solids at a temperature considerably above 100° C. under pressure sufficiently high to result in the production of pressure steam to be used as a heating agent for the raw material prior to the step of separating glue water from solids.

4. A process according to claim 3, in which the glue water is evaporated at temperature between 120 and 160° C.

MORTEN FLADMARK.

REFERENCES CITED

The following references are of record in the file of this patent:

UNITED STATES PATENTS

| Number | Name | Date |
|---|---|---|
| 408,824 | Cazin | Aug. 13, 1889 |
| 1,501,513 | Boberg | July 15, 1924 |
| 2,292,769 | Pattee | Aug. 11, 1942 |
| 2,403,174 | Ernst | July 2, 1946 |